United States Patent [19]

Hironaka et al.

[11] Patent Number: 5,104,943
[45] Date of Patent: Apr. 14, 1992

[54] RESIN COMPOSITION

[75] Inventors: Katsuhiko Hironaka, Sagamihara; Hiroo Inata; Shunichi Matsumura, both of Iwakuni, all of Japan

[73] Assignee: Stamicarbon B.V., Green, Netherlands

[21] Appl. No.: 359,472

[22] Filed: May 23, 1989

[30] Foreign Application Priority Data

May 23, 1988 [JP] Japan .................. 63-124001

[51] Int. Cl.$^5$ .............................. C08L 79/08
[52] U.S. Cl. ...................... 525/432; 525/436
[58] Field of Search .................. 525/432, 436

[56] References Cited

U.S. PATENT DOCUMENTS

| | | | |
|---|---|---|---|
| 4,340,697 | 7/1982 | Aya et al. | 525/420 |
| 4,515,924 | 5/1985 | Brooks et al. | 525/432 |
| 4,792,590 | 12/1988 | Zecher et al. | 525/424 |

Primary Examiner—Ana L. Carrillo

[57] ABSTRACT

The invention relates to a resin composition comprising 100 parts by weight polyamide 4.6 resin and 2 to 200 parts by weight of a polyamide amide resin.

The composition has improved HDT in wet state and improved impact resistance in dry state.

5 Claims, No Drawings

RESIN COMPOSITION

The invention is concerned with a polyamide 4.6 composition.

Polyamide 4.6 is a linear polyamide comprising recurring tetramethyleneadipamide units. This polyamide distinguishes itself from the other linear polyamides by its excellent high temperature properties, especially the heat deflection temperature (HDT). However under humid conditions the HDT is very negatively influenced. This effect is for polyamide 4.6 much more pronounced than for other polyamides, for instance polyamide 6.6.

The object of the present invention is therefore to improve the HDT of polyamide 4.6 in humid conditions, a further object is to realize this improvement without deteoriating the other mechanical properties of polyamide which distinguish it from the commodity polyamides, for instance polyamide 6 and 6.6.

Very suprisingly it has been found that polyamide 4.6 compositions comprising a polyamide imide show an appreciably smaller negative effect of humidity on the HDT but also a further improvement of the impact resistance in dry state.

The resin composition according to the invention comprises (A) 100 parts by weight of a polyamide 4.6 resin and (B) 2 to 200 parts by weight of a thermoplastic polyamide imide resin.

The improvement of the impact resistance could not be expected on the basis of the impact resistance of the polyamide 4.6 resin or the polyamide-imide resin, which both are appreciably lower than the value for the composition according to the invention.

The polyamide 4.6 resin used in the present invention as the component (A) is principally a polyamide prepared by the condensation reaction using adipic acid or its functional derivative as the acid component and tetramethylenediamine or its functional derivative as the amine component; however, a part of the adipic acid component or the tetramethylenediamine component may be substituted with other copolymerizable components.

A suitable process for preparing the polyamide 4.6 resin is described in EP-B-0039524 and 0038094 (U.S. Pat. Nos. 4,408,036 and 4,460,762 resp.).

The intrinsic viscosity of the polyamide 4.6 resin used in the present invention is preferably 0.80 to 1.90, especially 1.20 to 1.70 measured in m-cresol at 35° C.

It is not desirable to use a polyamide 4.6 resin having an intrinsic viscosity of exceeding 1.90, because the molding of the composition becomes difficult, the luster of the molded article is lost, and the fluctuation of the mechanical and thermal properties of the articles becomes large.

On the other hand, a polyamide 4.6 resin having an intrinsic viscosity lower than 0.80 has the disadvantage of giving a composition having poor mechanical strength.

The thermoplastic polyamide imide resin (B) used in the present invention is a polymer containing imide and amide bonds as constituent components in the polymer chain. From the viewpoint of heat-resistance, chemical resistance and moldability, preferably the polymer has recurring units expressed by the following general formula (A) as a main recurring unit.

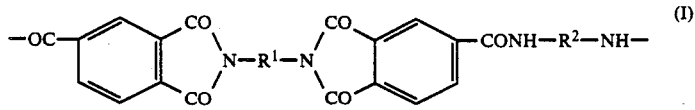

(I)

wherein $R^1$ is for example an alkylene group having a carbon number of 2 to 12, an aralkylene group having a carbon number of 7 to 15, a cycloalkylene group having a carbon number of 6 to 15 or an arylene group having a carbon number of 6 to 15, preferably an alkylene group $(CH_2)_n$ having a carbon number (n) of an even number, particularly n=6.

The group $R^2$ in the formula is an arylene group having a carbon number of 6 to 15, for example,

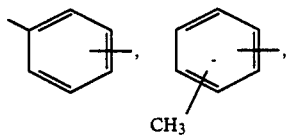

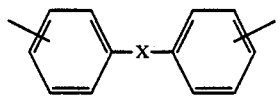

(wherein X is —O—, —SO$_2$—, —S—, —CO—, —CH$_2$—, etc.) and preferably

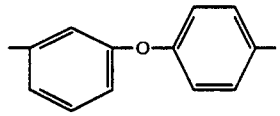

or

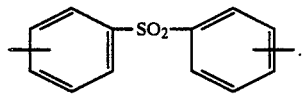

The polyamide imide resin may contain two or more kinds of recurring units and may contain the recurring unit of the following formula (II)

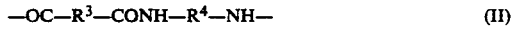

(wherein $R^3$ and $R^4$ are same as defined in the above $R^1$ and $R^2$) and the following formula (III)

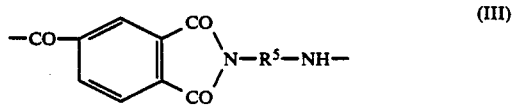

(III)

(wherein $R^5$ is arylene group having a carbon number of 6 to 15) and the following formula (IV)

(IV)

(wherein $R^6$ is arylene group having a carbon number of 6 to 15).

It is necessary that the polyamide imide resin of the present invention has an intrinsic viscosity of 0.3 or more. A resin having an intrinsic viscosity of smaller than 0.3 is undesirable because the mechanical properties of the resin are poor. More preferably, the intrinsic viscosity is 0.4 or more.

The above polyamide imide resin of the present invention can be produced by reacting a dicarboxylic acid component consisting of an imidedicarboxylic acid expressed by the following formula (V)

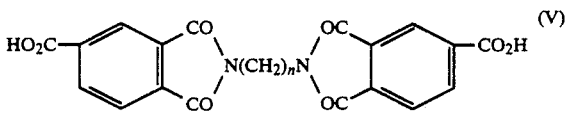
(V)

(wherein n is an integer of 2 to 12) and/or amide-forming derivative for instance an alkyl ester, aryl ester, acid halide and the like with diaminodiphenylsulfone and/or its amide-forming derivative for instance N,N'-diacyl-diamino-diphenylsulfone.

Among the imidedicarboxylic acids expressed by the above formula (V), especially prefered are compounds in which (n) is an even number, especially 6. Such imidedicarboxylic acids can be extremely easily produced for example by the conventional imidation reaction of trimellitic anhydride with the corresponding diamine $(NH_2-(CH_2)-_nNH_2)$.

The use of the imidedicarboxylic acid expressed by the above general formula (V) is most advantageous for the production of the polyamide imide resin of the present invention, however, an amide-forming derivative of said imidedicarboxylic acid may be used also for the same purpose; examples of such derivatives are esters of lower alkyls such as methyl, ethyl, etc., and esters of aryls such as phenyl, tolyl, etc.

A part (for example, 30 mol % or less, preferably 20 mol % or less) of the above imidedicarboxylic acid and/or its imide-forming derivative in the present invention may be replaced by another dicarboxylic acid and/or aminocarboxylic acid and/or their amide-forming derivative. Examples of such carboxylic acids are terephthalic acid, isophthalic acid, diphenyl ether dicarboxylic acid, diphenylsulfone dicarboxylic acid, succinic acid, adipic acid, sebacic acid, cyclohexanedicarboxylic acid, a dicarboxylic acid expressed by the following formula (VI)

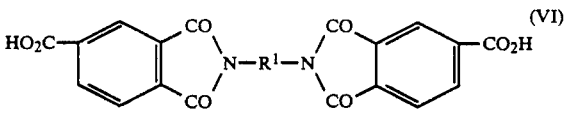
(VI)

(wherein $R^1$ is same as defined above) and examples of the aminocarboxylic acids are aminobenzoic acid and an aminocarboxylic acid expressed by the following formula (VII)

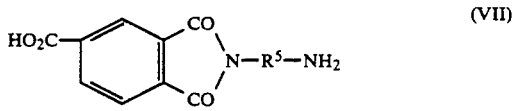
(VII)

(wherein $R^5$ is same as defined above).

The polyamide imide of the present invention can be produced by reacting a carboxylic acid component composed mainly of said imidecarboxylic acid (V) and/or its amide-forming derivative with diaminodiphenylsulfone or 3,4'-diaminodiphenyl ether and/or their amide-forming derivatives, wherein a part of the diaminodiphenylsulfone or 3,4'-diaminodiphenyl ether and/or their amide-forming derivatives may be replaced by other diamines and/or their amide-forming derivatives at a ratio of 50 mol % or less, more preferably 30 mol % or less.

Examples of such diamines are aromatic diamines for instance m- and p-phenylenediamine, diaminodiphenyl ether, diaminodiphenylmethane, diaminobenzophenone, 2-4-diaminotoluene, etc. Thus, the polyamide imide of the present invention can be produced by the condensation reaction of a carboxylic acid component composed mainly of the above imidedicarboxylic acid and/or its amide-forming derivative with an amine component composed mainly of diaminodiphenylsulfone or 3,4'-diaminophenyl ether and/or their amide-forming derivative. Said condensation reaction is carried out usually by using the carboxylic acid component and the amine component at an essentially stoechiometric ratio.

Preferably, the reaction is performed in the presence of a catalyst, a stabilizer or the like. Examples of the catalyst are various kinds of phosphorus compounds, boron compounds, heteropolyacids, etc. for instance trimethyl phosphite, triethyl phosphite, triphenyl phosphite, triphenylphosphine, phosphoric acid, boric acid, etc., and the stabilizers are for instance hindered phenolic antioxidants, etc., in addition to the phosphorus compounds mentioned above.

The reaction is carried out usually at 200° to 350° C., preferably 250° to 330° C. while distilling off water, acetic acid, phenol, etc., from the system. The reaction atmosphere may be atmospheric, elevated or reduced pressure. In the case of a reaction under atmospheric or elevated pressure, the reaction is preferably carried out in an inert gas atmosphere for instance nitrogen gas, argon gas, etc.

The following process is most prefered for producing the polyamide imide resin of the present invention. Trimellitic anhydride and 0.4 to 0.6 mol, more preferably 0.4 to 0.5 mol of a diamine expressed by formula $NH_2(CH_2)_nNH_2$ (wherein n is an integer of 2 to 12) based on 1 mol of the trimellitic anhydride are heated e.g. at 100° to 220° C. in the presence of an aromatic hydroxyl compound, preferably phenol, cresol, etc., while distilling off the produced water from the system to effect the imidation reaction of the components. Consequently the reaction product is subjected to the thermal condensation with diaminodiphenylsulfone or 3,4'-diaminodiphenyl ether and/or their amide-forming derivative in an essentially stoechiometric amount, i.e. 0.6 to 0.4 mol, more preferably 0.5 to 0.4 mol of the diamino compound based on 1 mol of the trimellitic anhydride, preferably in the presence of a catalyst under a condition shown above.

In the above condensation reaction, a dicarboxylic acid or an aminocarboxylic acid different from those mentioned above may be added provided that the dicarboxylic acid of the general formula (VI) produced by the above imidation reaction accounts for 70 mol % or more, preferably 80 mol % or more in the whole acid component. Also a part of the diaminodiphenylsulfone or 3,4'-diaminodiphenyl ether may be replaced with another kind of aromatic diamine at a ratio of 50 mol % or less, preferably 30 mol % or less. It is needless to say that the acid component and the amine component should be used at an essentially equivalent ratio to enable the formation of a linear polymer.

When 2 to 200 parts by weight of the above-mentioned polyamide imide resin is compounded with 100 parts by weight of a polyamide 4.6 resin, the lowering of the heat-deformation temperature in moistened state is much less than in the case of single use of a polyamide 4.6 resin. The heat-deformation temperature in absolute dry state remains at the same high level as for the 100% polyamide 4.6. The effect is remarkable compared with the level, that one would anticipate from the compounding ratio of the polyamide 4.6 resin and the polyamide imide resin. Furthermore, a remarkable improvement in the impact strength in absolute dry state is attained by the compounding of both components. This improvement is a unique phenomonon that could not be predicted from the properties of each component constituting the composition.

When the amount of the compounded polyamide imide resin is less than 2 parts by weight, there occurs no improvement in the above properties and when it is over 200 parts by weight, no improvement in the impact strength of the resin in absolute dry state is observed.

The resin composition of the present invention may incorporate, if required, effective amounts of a pigment or other additives. Examples of additives are fillers, e.g. fibrous materials such as glass fiber, asbestos, carbon fiber, aromatic polyamide fiber, potassium titanate fiber, steel fiber, ceramic fiber, boron whisker, etc. or powdery, granular or flaky inorganic fillers such as mica, silica, talc, calcium carbonate, glass beads, glass flakes, clay, wollastonite, etc.

The composition may further incorporate flame-retardants, for example a halogen-containing compound such as brominated biphenyl ether, brominated bispheol A diglycidyl ether and its oligomer, or a polycarbonate oligomer prepared from brominated bisphenol A; a phosphorus compound such as red phosphorus, triphenyl phosphate, etc.; a phosphorus-nitrogen compound such as phosphonic acid amide; a flame-retarding assistant such as antimony trioxide, zinc borate, etc.

In addition to the above, the composition may incorporate stabilizers, colorants, antioxidants, lubricants, ultraviolet absorbers and antistatic agents.

Further, minor amounts of another thermoplastic resin such as styrene resin, acrylic resin, polyethylene, polypropylene, fluororesin, other polyamide resin, polycarbonate resin, polysulfone, etc.; a thermosetting resin such as phenolic resin, melamine resin, unsaturated polyester resin, silicone resin, etc.; and a flexible thermoplastic resin such as ethylene-vinyl acetate copolymer, polyester elastomer, ethylene-propylene terpolymer, etc. may be present.

The resin composition of the present invention can be prepared by any compounding technique. Usually, it is preferably to disperse the components of the composition as uniformly as possible, which can be achieved either by mixing and homogenizing the whole or a part of the components with each other simultaneously or separately with a mixer such as blender, kneader, roll mill, extruder, etc., or by mixing a part of the components with each other simultaneously or separately using a mixer such as blender, kneader, roll mill, extruder, etc., and then mixing and homogenizing the mixture with the remaining part of the components using the above mixer or extruder. As an alternative method, a composition obtained by dry blending of the components is homogenized by melting and kneading in a heated extruder, extruded in the form of strands, and cut to desired length to obtain pellets. The molding composition prepared by the above process is usually kept in a sufficiently dried state, charged into the hopper of a molding machine, and molded. As an alternative method, the constituent raw materials of the composition are dry blended and charged directly into the hopper of a molding machine.

EXAMPLES

The present invention is described in more detail in the following examples, but is not limited thereto.

The properties cited in the examples were measured by the following methods.
(1) Static strength:
Flexural test—in accordance with ASTM D-790
Impact strength—in accordance with ASTM D-256 (Notched Izod)
(2) Heat deformation temperature:
measured according to ASTM D-648 under a load of 264 psi.
(3) Intrinsic viscosity:
The intrinsic viscosity of nylon 4.6 resin was measured in m-cresol solution at 35° C. and that of polyamide imide resin was measured in N-methyl-pyrrolidone at 35° C.

EXAMPLES 1 to 4

A reactor having a stirrer, a vacuum line and a distillation system furnished with a nitrogen-introducing port was charged with 464 parts of N,N'-hexamethylenebis-trimellitimide, 200 parts of 3,4'-diaminodiphenyl ether and 8 parts of triphenylphosphine and heated at 300° C. The reaction mixture became transparent and water began to distill off 10 minutes after the heating. The reaction was continued further for 1 hour at the same temperature, the temperature was raised to 310° C., the reaction system was gradually evacuated to 10 mmHg after about 15 minutes and to about 1 mmHg vacuum after further 15 minutes and the reaction was continued for 60 minutes under the above condition. The polyamide imide resin produced by this process was an amorphous transparent resin having an intrinsic viscosity of 0.64 and a Tg (glass temperature) of 172° C. The polyamide imide resin was resistant and stable to immersion in a solvent such as acetone, trichlene, xylene, etc.

The polyamide imide resin and a polyamide 4.6 resin, having an intrinsic viscosity of 1.67 ("STANYL", product of N.V. DSM, Netherlands), were dried at 110° C. under a vacuum of 100 Torr for 16 hours, after dry-blending with each other uniformly in a tumbler at the ratios shown in Table-1, molding pellets were obtained after melt kneading in a vented extruder having a screw diameter of 68 mm$\phi$ at a cylinder temperature of 310° C. while evacuating the extruder.

Test pieces for the measurement of various properties were molded from the pellets using a 5 oz. injection molding machine at a cylinder temperature of 300° C., injection pressure of 800 kg/cm$^2$, mold temperature of 120° C., cooling time of 15 seconds and total cycle time of 35 seconds.

The heat-deformation temperature and the mechanical strength of the test pieces were measured immediately after molding and after moisture-uptake.

The moistening of the test pieces was carried out at 40° C. in an atmosphere having a relative humidity of 90%. The moisture uptake was determined from the increase in the weight of the test pieces after conditioning.

The results are shown in the Table-1.

As can be seen clearly from the results shown in the Table-1, the impact strength of polyamide 4.6 resin in absolute dry state was improved remarkably by compounding with a polyamide imide resin derived from N,N'-hexamethylenebis-trimellitimide and 3,4'-diaminodiphenyl ether, without detoriating the characteristic features of polyamide 4.6 resin as for instance lowering of the flexural modulus of the resin in the case of improvement of the impact resistance with a rubber component, etc. (Examples 1 and 2).

There occurred no lowering of the heat-deformation temperature by the compounding of polyamide imide resin and the heat-deformation temperature was maintained at a high level even in a moistened state (Examples 3 and 4).

COMPARATIVE EXAMPLES 1 TO 3

Test pieces were produced by molding polyamide resin dried at 110° C. under a vacuum of 10 Torr for 16 hours under the same conditions as in Example 1. The heat-deformation temperature and mechanical strength of the test pieces were measured before and after moisture uptake.

The results are shown in the Table-1.

It can be seen from the table that single polyamide 4.6 resin has a lower impact strength in absolute dry state compared to the moistened state (Comparative example 1), however, the extremely high heat-deformation temperature in absolute dry state is remarkably lowered by moisture uptake (Comparative examples 2 and 3).

COMPARATIVE EXAMPLE 4

Test pieces were molded from the polyamide imide resin synthesized in Example 1 under the same conditions as Example 1 provided that the cylinder temperature was changed to 290° C.

The heat-deformation temperature and the mechanical strength of the test pieces are shown in the Table 1.

Particularly high impact strength was not attained by the single use of the polyamide imide resin.

EXAMPLES 5 AND 6

A reactor having a stirrer, a vacuum line and a distillation system furnished with a nitrogen-introducing port was charged with 384 parts of trimellitic anhydride, 116 parts of hexamethylenediamine and 1100 parts of phenol and the components were made to react at 140° to 200° C. for 2 hours in nitrogen gas stream while distilling the produced water from the reaction system. 248 parts of 4,4'-diaminodiphenylsulfone and 1.2 parts of triphenyl phosphite were added to the reaction product and heated at 300° C. The reaction mixture became transparent and water began to distill off after 10 minutes. The reaction was continued for 1 hour at the same temperature, the temperature was raised to 310° C., the reaction system was gradually evacuated to 10 mmHg after about 15 minutes and to about 1 mmHg vacuum after further 15 minutes and the reaction was continued for 20 minutes under the above conditions.

The polyamide imide resin produced by this process was an amorphous transparent resin having an intrinsic viscosity of 0.44 and a Tg of 219° C. The polymer was resistant and stable to immersion in a solvent such as acetone, trichloroethylene, xylene, etc.

The polyamide imide resin was compounded with polyamide 4.6 resin at ratios shown in the Table-1 and molded by the method similar to Example 1 to obtain test pieces.

The heat-deformation temperature and the mechanical strength of the test pieces are shown in the Table-1. Similarly to the Examples 1 to 4, improvement in the properties before and after the moisture uptake was attained also with a polyamide imide resin derived from N,N'-hexamethylelebis-trimellitimide and 4,4'-diaminodiphenylsulfone.

COMPARATIVE EXAMPLES 5 TO 7

Test pieces were produced from a polyamide 6.6 resin (Leona® 1300S, product of Asahi Chemical Ind. Co. Ltd.) dried at 110° C. for 12 hours under a vacuum of 10 Torr under the same conditions as Example 1 provided that the cylinder temperature was set to 280° C. The heat-deformation temperatures of the test pieces before and after moisture uptake are shown in the Table-1.

It is clear from the results shown in the Table-1 that the heat-deformation temperature of polyamide 6.6 resin is low compared with that of polyamide 4.6 resin and is nearly independent of moisture uptake.

TABLE 1

| | Composition (pts. wt.) | | | | | | |
|---|---|---|---|---|---|---|---|
| | Component A Nylon 4.6 resin | Component B Polyamide imide resin ($R^1$, $R^2$) | Nylon 6.6 resin | Moisture Content (%) | Heat-deformation Temperature (°C.) | Flexural Modulus (Kg/cm³) | Impact Strength (kg · cm/cm) |
| Example 1 | 90 | 10  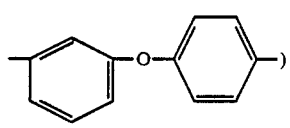 | — | 0* | 228 | 32000 | 15 |
| Example 2 | 70 | 30 | — | 0* | 214 | 31000 | 16 |

TABLE 1-continued

| | Composition (pts. wt.) | | | | | | |
|---|---|---|---|---|---|---|---|
| | Component A Nylon 4.6 resin | Component B Polyamide imide resin ($R^1$, $R^2$) | Nylon 6.6 resin | Moisture Content (%) | Heat-deformation Temperature (°C.) | Flexural Modulus (Kg/cm³) | Impact Strength (kg · cm/cm) |
| Example 3 | 70 | 30 ($-(CH_2)_6-$, phenyl-O-phenyl) | — | 1.6 | 169 | — | — |
| Example 4 | 70 | 30 ($-(CH_2)_6-$, phenyl-O-phenyl) | — | 2.0 | 163 | — | — |
| Comparative ex. 4 | — | 100 ($-(CH_2)_6-$, phenyl-O-phenyl) | — | 0* | 162 | 31000 | 9 |
| Example 5 | 95 | 5 ($-(CH_2)_6-$, phenyl-O-phenyl) | — | 0* | 232 | 31000 | 8 |
| Example 6 | 95 | 5 ($-(CH_2)_6-$, phenyl-$SO_2$-phenyl) | — | 1.1 | 182 | — | — |
| Comp. ex. 1 | 100 | — ($-(CH_2)_6-$, phenyl-$SO_2$-phenyl) | — | 0* | 230 | 29000 | 7 |
| Comp. ex. 2 | 100 | — | — | 1.0 | 140 | 22000 | 10 |
| Comp. ex. 3 | 100 | — | — | 2.6 | 120 | 18000 | 19 |
| Comp. ex. 5 | — | — | 100 | 0* | 73 | — | — |
| Comp. ex. 6 | — | — | 100 | 0.8 | 65 | — | — |
| Comp. ex. 7 | — | — | 100 | 2.2 | 70 | — | — |

*Measured in just-molded state

We claim:

1. A resin composition comprising (A) 100 parts by weight of polyamide 4.6 resin and (B) 2-200 parts by weight of a thermoplastic polyamide imide resin.

2. A resin composition of claim 1 wherein the polyamide imide resin contains the unit expressed by the following general formula (I) as main recurring unit.

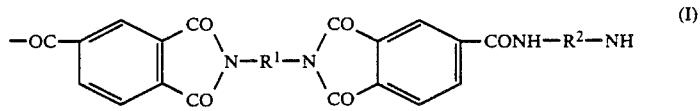

(wherein $R^1$ is an alkylene group having a carbon number of 2 to 12, an aralkylene group having a carbon number of 7 to 15, a cycloalkylene group having a carbon number of 6 to 15 or an arylene group having a carbon number of 6 to 15 and $R^2$ is an arylene group having a carbon number of 6 to 15).

3. A resin composition of claim 2 wherein $R^1$ in the above general formula (I) is an alkylene group having a carbon number of 2 to 12.

4. A resin composition of claim 3 wherein $R^2$ in the above general formula (I) is

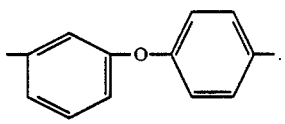

5. A resin composition of claim 3 wherein $R^2$ in the above general formula (I) is

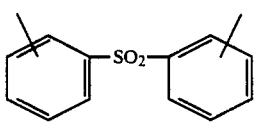

* * * * *